(12) United States Patent (10) Patent No.: US 8,108,235 B2
Chowdhary et al. (45) Date of Patent: Jan. 31, 2012

(54) SYSTEM AND METHOD FOR APPLYING PREDICTIVE METRIC ANALYSIS FOR A BUSINESS MONITORING SUBSYSTEM

(75) Inventors: Pawan Raghunath Chowdhary, Montrose, NY (US); Shubir Kapoor, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 12/053,045

(22) Filed: Mar. 21, 2008

(65) Prior Publication Data

US 2008/0167923 A1 Jul. 10, 2008

(51) Int. Cl.
    *G06Q 10/00* (2006.01)
(52) U.S. Cl. ...................... 705/7.11; 705/7.29
(58) Field of Classification Search ............... 705/7, 10, 705/7.11, 7.29
    See application file for complete search history.

(56) References Cited

U.S. PATENT DOCUMENTS

| | | |
|---|---|---|
| 5,918,226 A | 6/1999 | Tarumi et al. |
| 6,009,407 A | 12/1999 | Garg |
| 6,249,769 B1 | 6/2001 | Ruffin et al. |
| 6,611,839 B1 | 8/2003 | Nwabueze |
| 6,647,394 B1 | 11/2003 | Herzberg et al. |
| 6,708,155 B1 * | 3/2004 | Honarvar et al. ............ 705/7 |
| 6,763,353 B2 | 7/2004 | Li et al. |
| 6,873,961 B1 | 3/2005 | Thrope et al. |
| 6,934,687 B1 | 8/2005 | Papierniak et al. |
| 6,947,951 B1 | 9/2005 | Gill |
| 6,954,758 B1 | 10/2005 | O'Flaherty |
| 7,389,211 B2 * | 6/2008 | Abu El Ata et al. ............ 703/2 |
| 2003/0236689 A1 * | 12/2003 | Casati et al. .................. 705/7 |
| 2004/0138933 A1 * | 7/2004 | LaComb et al. ............... 705/7 |
| 2006/0184414 A1 * | 8/2006 | Pappas et al. ................ 705/10 |
| 2007/0179833 A1 * | 8/2007 | Moorthy et al. ............. 705/10 |
| 2008/0167923 A1 * | 7/2008 | Chowdhary et al. .......... 705/7 |

OTHER PUBLICATIONS

The dawning of the autonomic computing era By A.G. Ganek and T.A. Corbi IBM Systems Journal, vol. 42, No. 1, 2003.*
Chandra et al.; "Dynamic Resource Allocation for Shared Data Centers Using Online Measurements"; ACM; 2003.
Bernstein, P., "Applying Model Management to Classical Meta Data Problems", Microsoft Research, 2003 CIDR Conference, 12 pages.
Golfarelli, Rizzi and Cella, "Beyond Data Warehousing: What's Next in Business Intelligence?". DOLAP'04, Nov. 12-13, 2004, Washington, DC, USA.

* cited by examiner

*Primary Examiner* — Beth V Boswell
*Assistant Examiner* — Ernest A Jackson
(74) *Attorney, Agent, or Firm* — Whitham, Christofferson & Cook, P.C.; Daniel P. Morris

(57) ABSTRACT

Predictive metric analysis for business management is divided into build time, corresponding to the business owner view of the enterprise, and run time, corresponding to the information technology view of the enterprise. The build time consists of a predictive model and a monitoring model. These models go through transformation processes to the components of the run time. The run time components are a Metric Value Prediction Service (MVPS), which receives as input predictive model transformation and outputs predicted metric values, and a monitoring engine, which receives as input monitoring model transformation, the predicted metric values and business events from the business process. Various analytical engines can be plugged in to provide the predictive capabilities. Input is provided to a framework from various business systems which results in predicting the value of the metrics across the future time horizons.

16 Claims, 5 Drawing Sheets

Building Solutions with MVPS

SYSTEM AND METHOD FOR APPLYING PREDICTIVE METRIC ANALYSIS FOR A BUSINESS MONITORING SUBSYSTEM

BACKGROUND OF THE INVENTION

1. Field of the Invention

The present application generally relates to business monitoring systems and, more particularly, to a model driven approach to enhance existing business performance models with predictive modeling capabilities.

2. Background Description

For an enterprise to be competitive, the ability to perform predictive analysis on large amount of data is very important to analyze a trend, discover the paint points, and/or discover new opportunities. Most companies today implement various Business Performance Management solutions including Business Intelligence techniques that help determine the current state of the business. This is achieved by defining metrics or key performance indicators organized in a hierarchy through the various vertical and horizontal silos of the organization. Data and events received in real time are persisted in a data mart and are used to provide historical analysis summarizing what has happened in the past. In other words, historical analysis can reveal who the best customers were last month and who they were this month. This kind of traditional analysis cannot reveal what will happen in the future. Predictive analysis discovers meaningful patterns and relationships in data separating the signals from the noise thereby helping in improved decision making. Business process monitoring models currently lack the ability to incorporate the meta-data for such predictive models, which restricts the models' ability to capture such metrics. There are currently limited modeling capabilities and supporting tools to capture the metric definition, relationships, dimensions, semantics and their management. The available tools today limit metrics modeled as hierarchical structure with value dependency. This implies that the existing models are also not sophisticated enough to capture the relationship of time as a dimension to allow for look-ahead prediction of the metrics such as dynamic systems models, time-series based models, forecasting, propensity and scoring models. Combining predictive analysis with organization business process and performance management provides insight into critical business issues and enables proactive decision making and risk management amongst other benefits.

There are many subsystems available that provide prediction capabilities. Among these are general purpose systems such as data mining tools and system dynamics. Data mining tools provide scoring models and predictions based on historical data; however, data mining tools do not provide metric values but can determine qualitative relationships. It is objective in nature. System dynamics use continuous modeling to predict values of metrics based on the specified time dimension; however, system dynamics is subjective since it is based on the user's perception of the metric network and relationships.

The integration of these predictive systems with standard business process monitoring and management systems has always been a challenge. Business monitoring systems are built using metrics catering to the current and in some cases historical aspects of the business whereas predictive models look ahead in time. The current invention features a novel mix of both these capabilities in order to provide a system and method for predictive metric analysis to a business monitoring subsystem

SUMMARY OF THE INVENTION

According to the present invention, there is provided a business performance metamodel comprising business metrics organized as a hierarchy across the operational, tactical and strategic levels of an organization. A metamodel is a model that describes a language in which models can be expressed. A metamodel spanning the operational level of an organization is comprised of transaction metrics organized in a hierarchy. For instance, in the transportation industry, OnTimeDelivery constitutes one of the most important transactional metrics. It is derived from two lower level transactional metrics: Shipment Dispatched and Shipment Arrived. The difference between the shipment arrival time and the shipment dispatch time generates the value for the OnTimeDelivery metric. A metamodel spanning the tactical level of an organization is comprised of tactical metrics which are aggregate by nature and have an inherent relationship between themselves and their corresponding lower level operational metrics. For instance, Efficiency is tactical metric which is usually generated across a department or a hub and aggregated over the OnTimeDelivery metric of every shipment for that department or hub. A metamodel spanning the strategic level of an organization is comprised of C-level strategic metrics which have an inherent relationship amongst themselves and their corresponding lower level tactical metrics. For instance, customer satisfaction is a strategic metric that the C-level executive measures themselves against and is derived from the efficiency of the department or hub amongst other tactical metrics. Most of the existing business performance meta models do not consider time as a first class element and therefore allow for modeling the current state of the business but not future predictions of any of the metrics. The current invention considers time as a first class element associated with each predictive metric which defines the horizons for prediction. A predictive metric is derived from a regular metric with the additional association of time for look ahead predictive capabilities. The invention also provides the modeling of relationships between metrics that are needed for the predictive analysis, thereby describing the expected changes in behavior of these metrics over time. These metrics are organized in a predictive metric context. The invention further provides the modeling of the trigger conditions that describe when and how the predictive analysis should be performed. Users create business performance models enhanced with predictive capabilities based on the specified meta model. The business performance model is then transformed into a platform independent IT model. A platform independent IT model is a description of the solution, independent of the platform on which it executes. There are three core models which serve as the platform independent IT model—predictive model interfaces, warehouse model and solution composition model. The predictive model interfaces are used as inputs to the MVPS (metric value prediction service). This service serves to interface data and metrics with various analytical solutions to perform the predictive capabilities. Metrics modeled within the predictive metric context are passed in from the business monitoring subsystem based on the trigger conditions also described in the model. The solution composition model orchestrates the business performance solution consisting of the business events and metric hierarchy and interfaces with the MVPS. The warehouse model serves to persist the current and predicted state of the business that is exploited by the business monitoring subsystem as well as the MVPS.

There are various analytical techniques that can provide the predictive capabilities within the context of an end to end solution. Some examples are data and text mining, system modeling and dynamics, time series analysis and forecasting etc. Each technique is chosen based on the analysis of the data along with the business process currently being monitored coupled together with the overall organization strategy.

For example, an insurance company looking to improve healthcare and reduce costs would implement a data mining based predictive model which examines claims data and predicts individual usage of healthcare services over the next insured period. The metrics involved in the analysis and historical data provided usually don't have any fixed patterns and therefore an important component of the prediction would be to devise a pattern from the historical claims data. The predictive metrics in this scenario would be claim type (i.e. dental, medical, pharmaceutical, disability etc) and costs for every member. The trigger would be tied to every claim being submitted by the particular member which implies that the predictive model will be executed every time a member files a claim with the insurance company. The MVPS would be responsible for interfacing with the data mining based predictive model to generate the prediction of the claim types and costs the results of which would be sent back to the monitoring engine and warehouse for further analysis.

Another example where predictive analysis would be useful is in the electronics industry where the predictions of customer ordering behavior can significantly allow responding in ways to avoid deleterious outcomes, i.e., migrating supply to upward trending demand before pending orders emerge. For this purpose, a time series based forecasting system would be applicable that would factor in seasonality, order skews, product life-cycles and repetitive order trends in order to make its prediction. The predictive metrics in this scenario would be future weekly order loads. The trigger would be tied to the daily demand-supply decision cycles implying that the predictive capability would be executed daily, possibly tied to a scheduler. The MVPS would be responsible for interfacing with the forecasting system to generate the daily trends the result of which would be sent back to the monitoring engine and warehouse for further analysis.

The present invention thus provides a computer-implemented method, a machine-readable medium instructing a computer, and a system to provide predictive modeling capabilities to allow intelligent business performance management comprising: generating a meta model consisting of business metrics organized as a hierarchy with each metric having the ability to be associated with time as a look-ahead dimension; a computer transforming the meta model to service interface definition and related artifacts; a computer transforming the meta model into performance warehouse metadata schemas to allow persistence of historical data; and a computer receiving requests for metric predictions and using analytical techniques to service the requests in real time. The meta model may also comprise business metrics categorized within a predictive metric context to be used as input for predictive analysis and may further comprise trigger conditions describing how and when said predictive analysis will be triggered.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
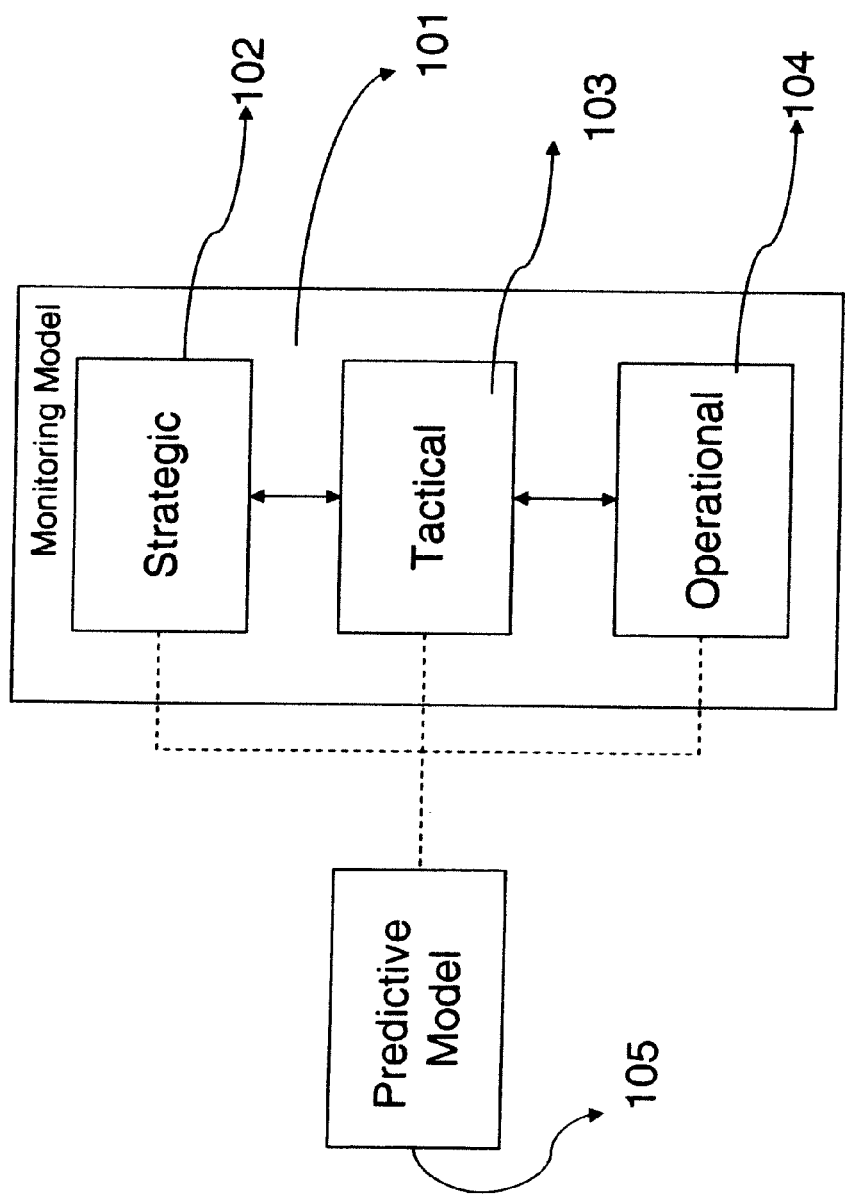
FIG. 1 is a description of the various levels and their relationships in a regular business performance model. Also depicted are predictive extensions at all levels in the model.
Figure 4:
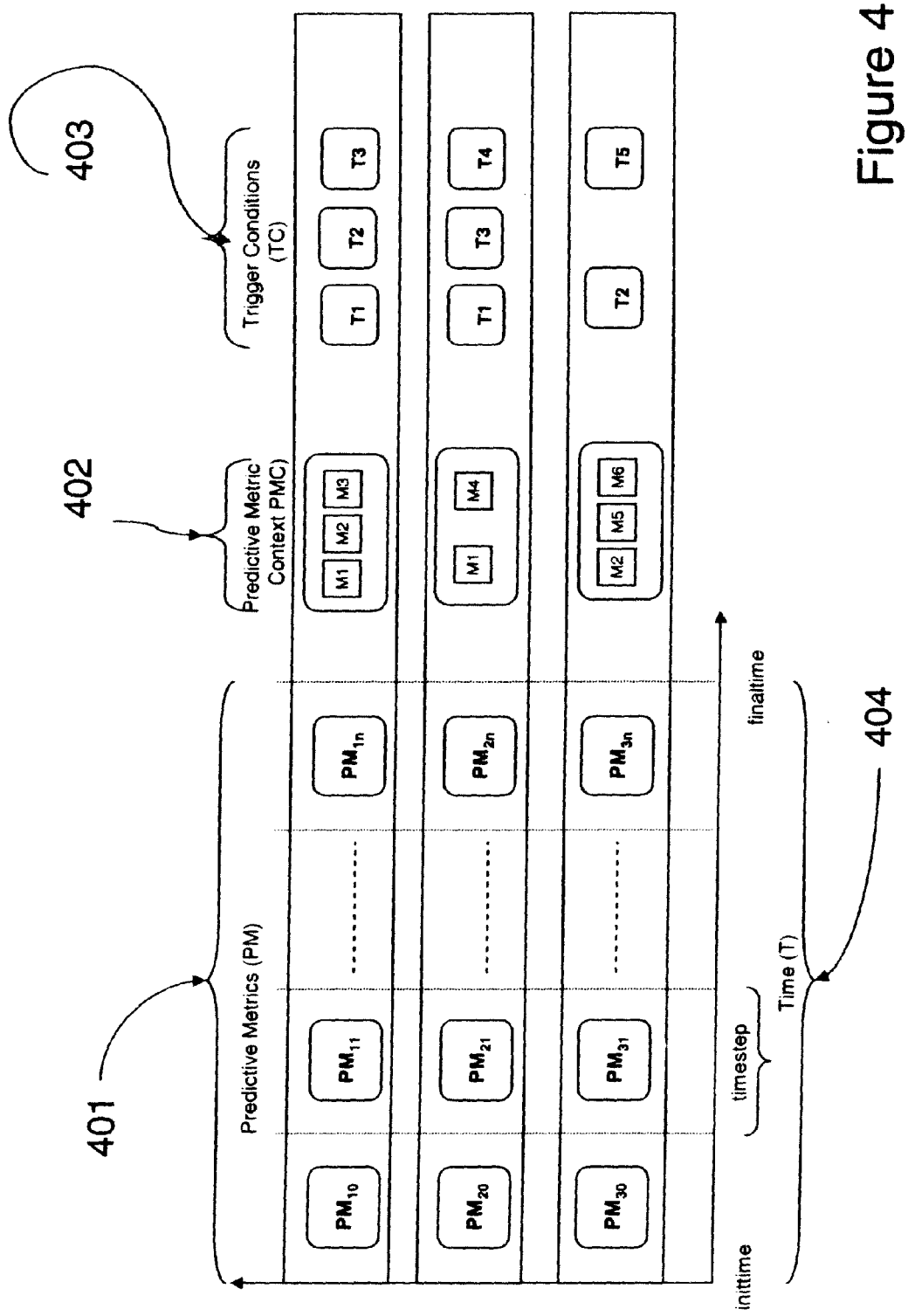
FIG. 4 is data diagram illustrating in more detail the predictive model.

Referring now to the drawings, and more particularly to FIG. 1, Business Performance Model and Predictive Extensions, there is shown the predictive metric management implemented by the invention. At the top of this diagram are the components of the build time, corresponding to the business owner view of the enterprise. This consists of a predictive model 105 and a monitoring model 101. The predictive model is shown to derive the information on top of the monitoring models. Typically, a metric of interest for the predictive analysis can be chosen along with context metric for predictive analytics. The System then assists user to add additional information as shown in FIG. 4.

The monitoring model generally contains metrics that needs to be monitored and corresponding context metrics. These metrics are typically grouped into three levels such as Operational 104, Tactical 103 and Strategic 102. The grouping of metric helps in determining the level of users and the latency of the metric calculation.

Figure 2:
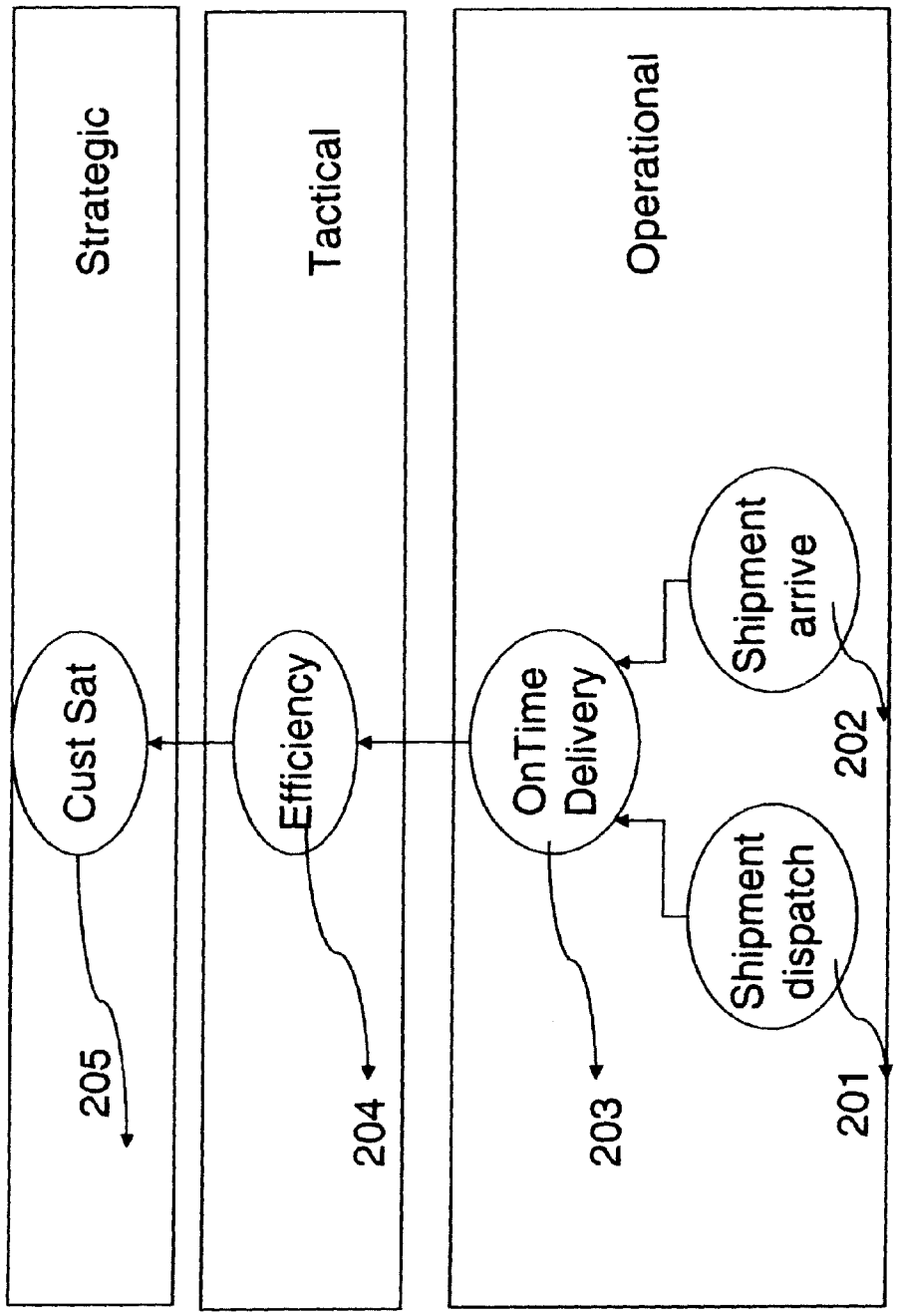
FIG. 2 shows an example of the metrics at the various level of the models.

For example FIG. 2, An Example of the Levels in a Typical Business Performance Model, illustrates a hierarchy of metrics that spans across the three levels as mentioned above. Typically the leaf node metrics always belongs to the Operational level. Shipment Dispatch 201 and Shipment Arrive 202 are metrics that contains the atomic data and hence shown in the figure as part of Operational level. The On Time Delivery 203 metric derives its value from 201 and 202 metric. This metric again represents data for the user that typically belongs to this level, such as Operations manager, hence this metric also belongs to the Operational level. Similarly based on the user profile and importance the rest of the metric Efficiency 204 belongs to Tactical level and Customer Satisfaction 205 belongs to Strategic level.

Figure 3:
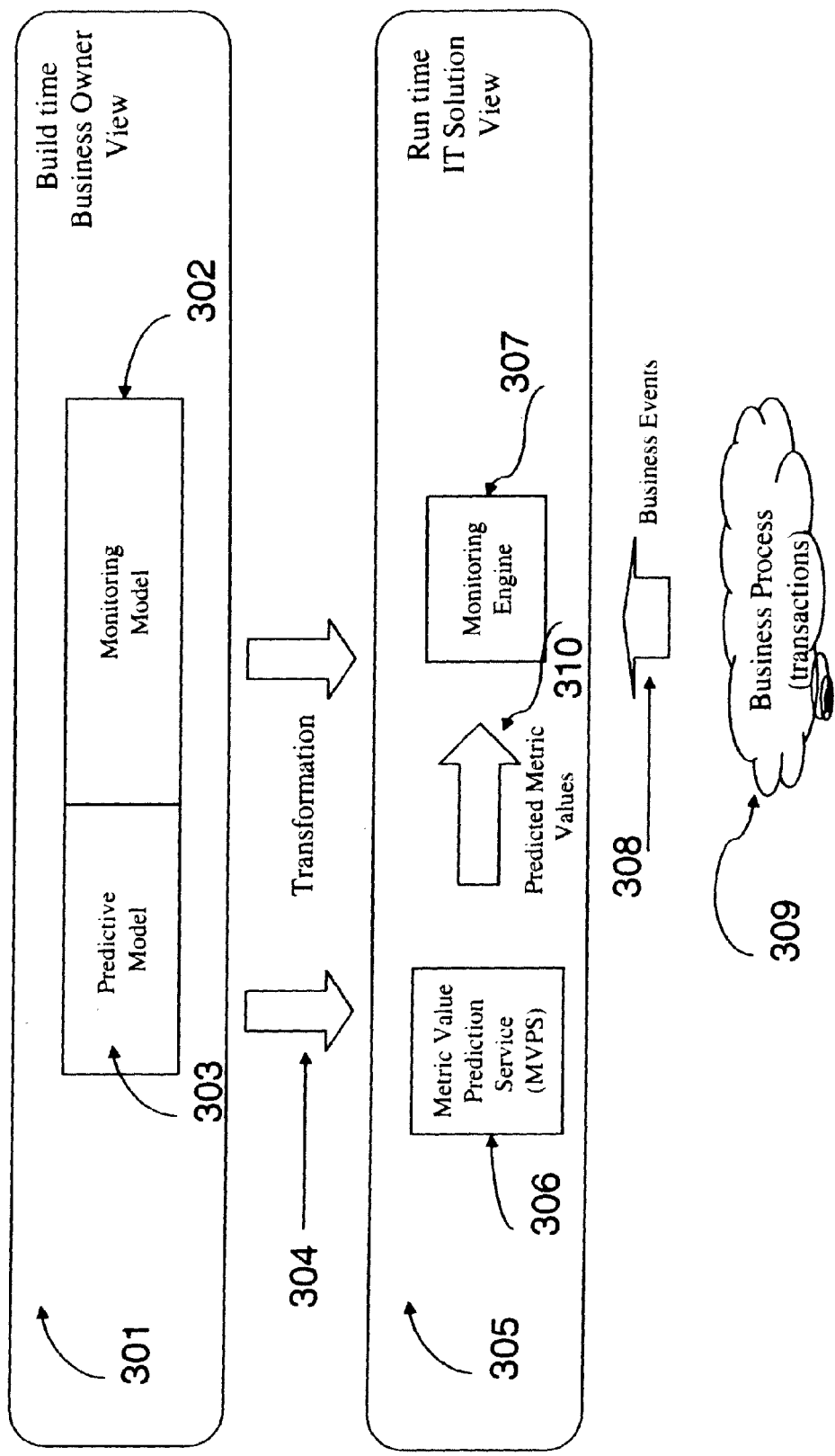
FIG. 3 is a data flow diagram illustrating the predictive metric management implemented by the invention.

FIG. 3, Predictive Metric Management, illustrates the high level view of the predictive management System. Build time 301 illustrates the build time activity when first monitoring model 302 gets designed. Once monitoring model 302 is available, one selects the metrics of interest for the predictive model 303. These models go through transformation process 304 to the components of the run time 305, corresponding to the information technology (IT) view. These components are a Metric Value Prediction Service (MVPS) 306, which receives as input the predictive model transformations 304 and outputs predicted metric values 310, and a monitoring engine 307, which receives as input monitoring model transformation, the predicted metric values and business events 308 from the business process 309 (i.e., transactions). How to extend a monitored metric into predictive model and over all view of the run time process is shown later.

FIG. 4, Predictive Model, illustrates the process of extending a metric in the monitoring model and its corresponding context into predictive model. As shown in FIG. 4, the predictive model is described as follows. The predictive annotations, PA, is a 4-tuple, <PM, PMC, TC, T>, where PM is a set of predictive metrics 401 $\{pm_1, pm_2, \ldots, pm_n\}$ whose values will be predicted based on changes in the business environment, PMC is the PredictiveMetricContext 402 consisting of a group of metrics $\{m_1, m_2, \ldots, m_m\}$ which constitutes the context around which the prediction will be done, TC are the trigger conditions 403 $\{tc_1, tc_2, \ldots, tc_m\}$ that cause the monitoring engine to trigger a prediction request to the prediction service, and T is the time bounds 404 for the model consisting of {inittime, finaltime, timestep, timeunits}. "inittime" is the time the prediction starts. It defaults to 0 unless specified otherwise. "finaltime" is the time the prediction ends. "timestep" defaults to 1 unless specified otherwise. "timeunit" is a predetermined unit of time; e.g., year, qtr, month, week, day hour, minute second. Time Buckets, TB $\{tb_1, tb_2, \ldots, tb_y\}$, are generated by the system where y=(finaltime−inittime)/timestep and every $tb_i$ is a timebucket belonging to the timeunit. For every $pm_i$, the Prediction Engine will generate $\{pmtb_1, pmtb_2, \ldots, pmtb_y\}$ where y is the number of time buckets generated by the system.

Figure 5:
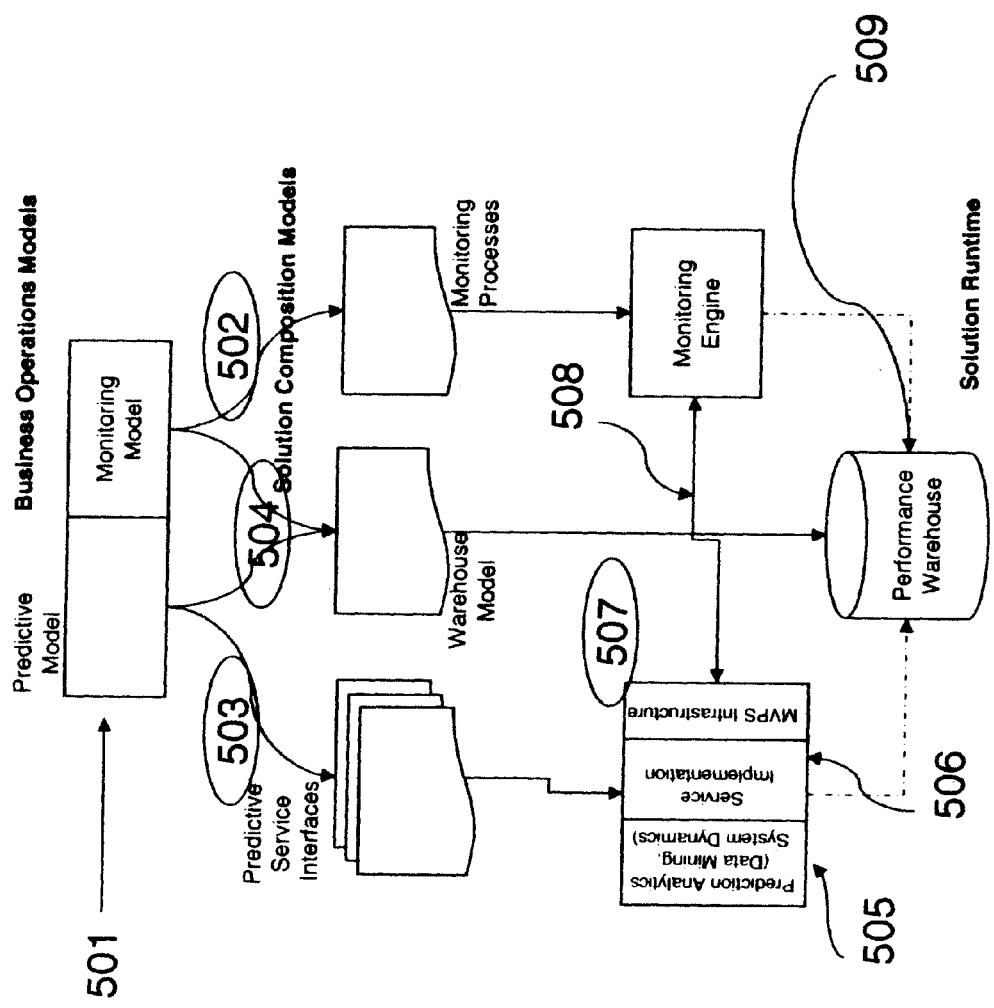
FIG. 5 is a block diagram showing the solution runtime process of the invention.

FIG. 5, Building Solutions with MVPS, illustrates the processing steps in order to build a solution for Metric Value Prediction Service (MVPS). Typically one starts at step 501 with annotating the metrics of interest in the monitoring model with the predictive model annotations as explained earlier. The second step at 502 is to transform the monitoring model consisting of monitored metrics and its corresponding contextual metric elements into the representation acceptable by the monitoring engine. The third step at 503 is to transform the predictive annotations into appropriate service interface definitions defined by MVPS. The fourth step at 504 is to transform the monitoring model and predictive annotations into a warehouse model to persist historical data for analysis purposes and also to assist various analytical engines with the appropriate data. The fifth step at 505 is to define the analytical capability to predict metric relationships and attribute values (e.g., data mining, systems dynamics, etc). The monitoring model and predictive annotations are used as input. The sixth step at 506 is to build a service implementation definition for the analytical engine and based on the interface definitions. The seventh step at 507 is performed at runtime, as a result of which the monitoring engine sends a request to the prediction engine when metrics associated to the predicted metrics are changed. At the eighth step at 508, the prediction engine predicts the future values of the metrics and sends it back to the monitoring engine. Finally, both predictive metric values and monitored values are persisted in the data warehouse 509 that was generated earlier.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for providing predictive modeling capabilities to allow intelligent business performance management of a business comprising the steps of:
   generating, using a computer, a meta model consisting of business metrics relating to performance of the business with its customers organized as a hierarchy across operational, tactical and strategic levels of the business with each metric having the ability to be associated with time as a look-ahead dimension, wherein the computer-generated meta model is a model that describes a language in which models can be expressed, and wherein the computer-generated meta model includes:
   an operational level of the business comprising transactional metrics organized in a hierarchy,
   a tactical level of the business comprising tactical metrics having a relationship with corresponding lower level transactional metrics, and
   a strategic level of the business comprising strategic metrics having a relationship with lower level tactical metrics;
   associating time with each business metric as a look-ahead dimension; transforming, using a computer, the meta model to service interface definition and related artifacts;
   transforming, using a computer, the meta model into performance warehouse meta-data schemas without losing persistence of historical data related to the performance of the business with its customers; and
   using a computer, receiving requests for metric predictions and servicing the requests in real time by using predictive analysis predicting individual usage of a certain service in a next time period or predicting individual customer ordering behavior for a future time.

2. The method of claim 1, wherein said meta model also comprises business metrics categorized within a predictive metric context to be used as input for predictive analysis.

3. The method of claim 2, wherein said meta model also comprises trigger conditions describing how and when said predictive analysis will be triggered.

4. A system for providing predictive modeling capabilities to allow intelligent business performance management of a business comprising:
   a computer generating a meta model consisting of business metrics relating to performance of the business with its customers organized as a hierarchy across operational, tactical and strategic levels of the business with each metric having the ability to be associated with time as a look-ahead dimension, wherein the meta model is a model that describes a language in which models can be expressed and wherein the computer-generated meta model includes:
   an operational level of the business comprising transactional metrics organized in a hierarchy,
   a tactical level of the business comprising tactical metrics having a relationship with corresponding lower level transactional metrics, and
   a strategic level of the business comprising strategic metrics having a relationship with lower level tactical metrics;
   a computer transforming the meta model to service interface definition and related artifacts;
   a computer transforming the meta model into performance warehouse meta-data schemas without losing persistence of historical data relating to performance of the business with its customers; and
   a computer receiving requests for metric predictions and using analytical techniques to service the requests in real time by using predictive analysis predict individual usage of a certain service in a next time period or predict individual customer ordering behavior for a future time.

5. The system of claim 4, wherein said meta model also comprises business metrics categorized within a predictive metric context to be used as input for predictive analysis.

6. The method of claim 5, wherein said meta model also comprises trigger conditions describing how and when said predictive analysis will be triggered.

7. A non-transitory computer-readable medium for providing predictive modeling capabilities to allow intelligent business performance management of a business, on which is provided:

instructions for using a computer to generate a meta model consisting of business metrics relating to performance of the business with its customers organized as a hierarchy across operational, tactical and strategic levels of the business with each metric having the ability to be associated with time as a look-ahead dimension, wherein the meta model is a model that describes a language in which models can be expressed and wherein the computer-generated meta model includes:

an operational level of the business comprising transactional metrics organized in a hierarchy, a tactical level of the business comprising tactical metrics having a relationship with corresponding lower level transactional metrics, and a strategic level of the business comprising strategic metrics having a relationship with lower level tactical metrics;

instructions for using a computer to transform the meta model to service interface definition and related artifacts;

instructions for using a computer to transform the meta model into performance warehouse meta-data schemas without losing persistence of historical data relating to performance of the business with its customers; and instructions for using a computer to receive requests for metric predictions and to use analytical techniques to service the requests in real time by using predictive analysis predict individual usage of a certain service in a next time period or predict individual customer ordering behavior for a future time.

8. The non-transitory computer readable medium of claim 7, wherein said meta model also comprises business metrics categorized within a predictive metric context to be used as input for predictive analysis.

9. The non-transitory computer readable medium of claim 8, wherein said meta model also comprises trigger conditions describing how and when said predictive analysis will be triggered.

10. The method of claim 1, including generating a meta-model in which the operational level is a low level, the tactical level is a middle level and the strategic level is a high level.

11. The method of claim 10, including generating a meta-model in which the operational level comprises On Time Delivery, Shipment Dispatch and Shipment Arrive.

12. The method of claim 10, including generating a meta-model in which the tactical level comprises Efficiency.

13. The method of claim 10, including generating a meta-model in which the strategic level comprises Customer Satisfaction.

14. The method of claim 1, including performing a look-ahead by computing a function of time based on an initial time, a time step, and a final time.

15. The method of claim 1, including receiving insurance claims data as input and predicting individual usage of healthcare services over a next insured period.

16. A method for providing predictive modeling capabilities to allow intelligent business performance management of a business comprising the steps of:

generating, using a computer, a meta model consisting of business metrics relating to performance of the business with its customers organized as a hierarchy across operational, tactical and strategic levels of the business with each metric having the ability to be associated with time as a look-ahead dimension, wherein the computer-generated meta model is a model that describes a language in which models can be expressed, and wherein the computer-generated meta model includes: an operational level of the business comprising transactional metrics organized in a hierarchy, a tactical level of the business comprising tactical metrics having a relationship with corresponding lower level transactional metrics, and a strategic level of the business comprising strategic metrics having a relationship with lower level tactical metrics;

associating time with each business metric as a look-ahead dimension; transforming, using a computer, the meta model to service interface definition and related artifacts;

transforming, using a computer, the meta model into performance warehouse meta-data schemas without losing persistence of historical data related to the performance of the business with its customers.

* * * * *